Patented Aug. 16, 1932

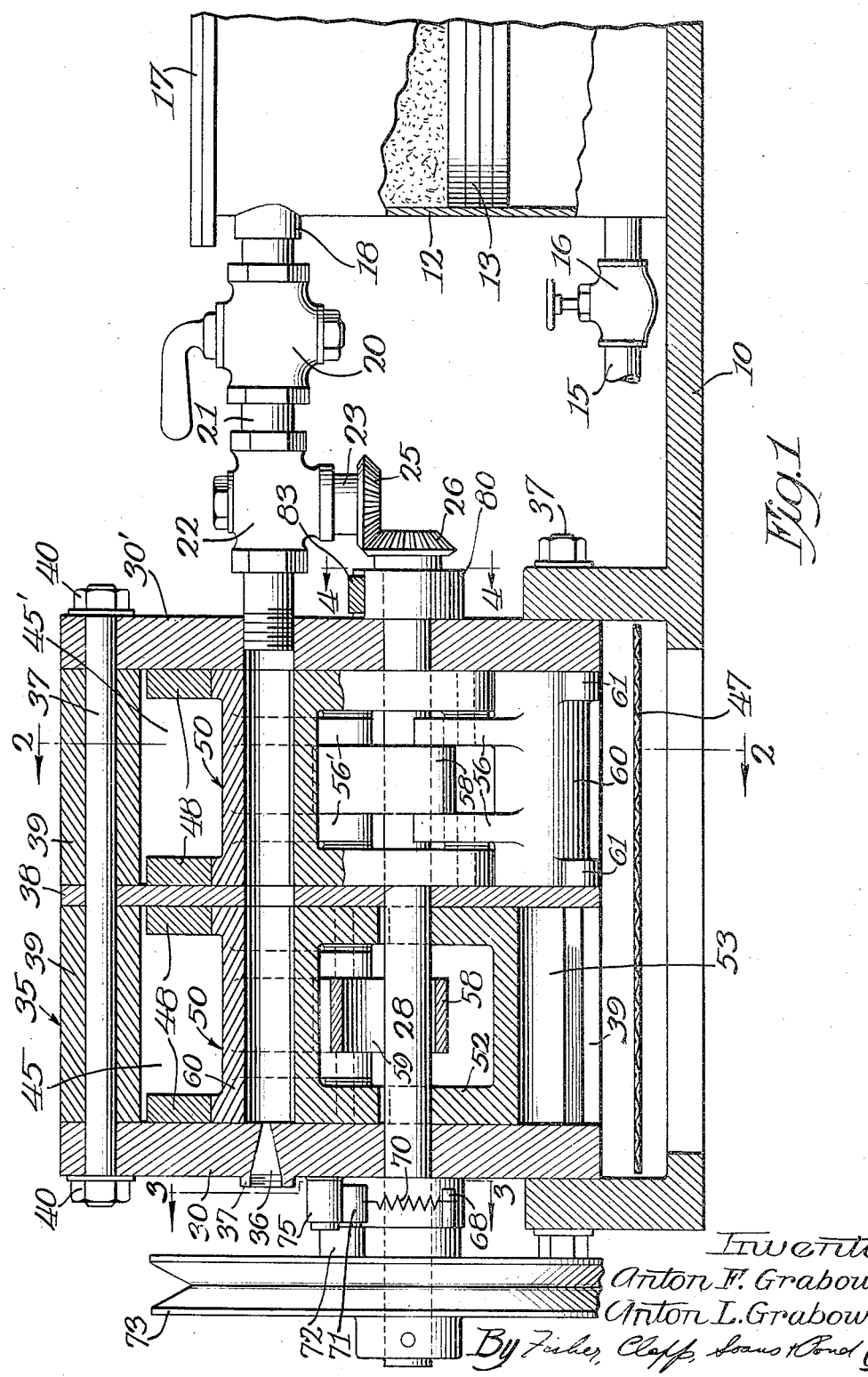

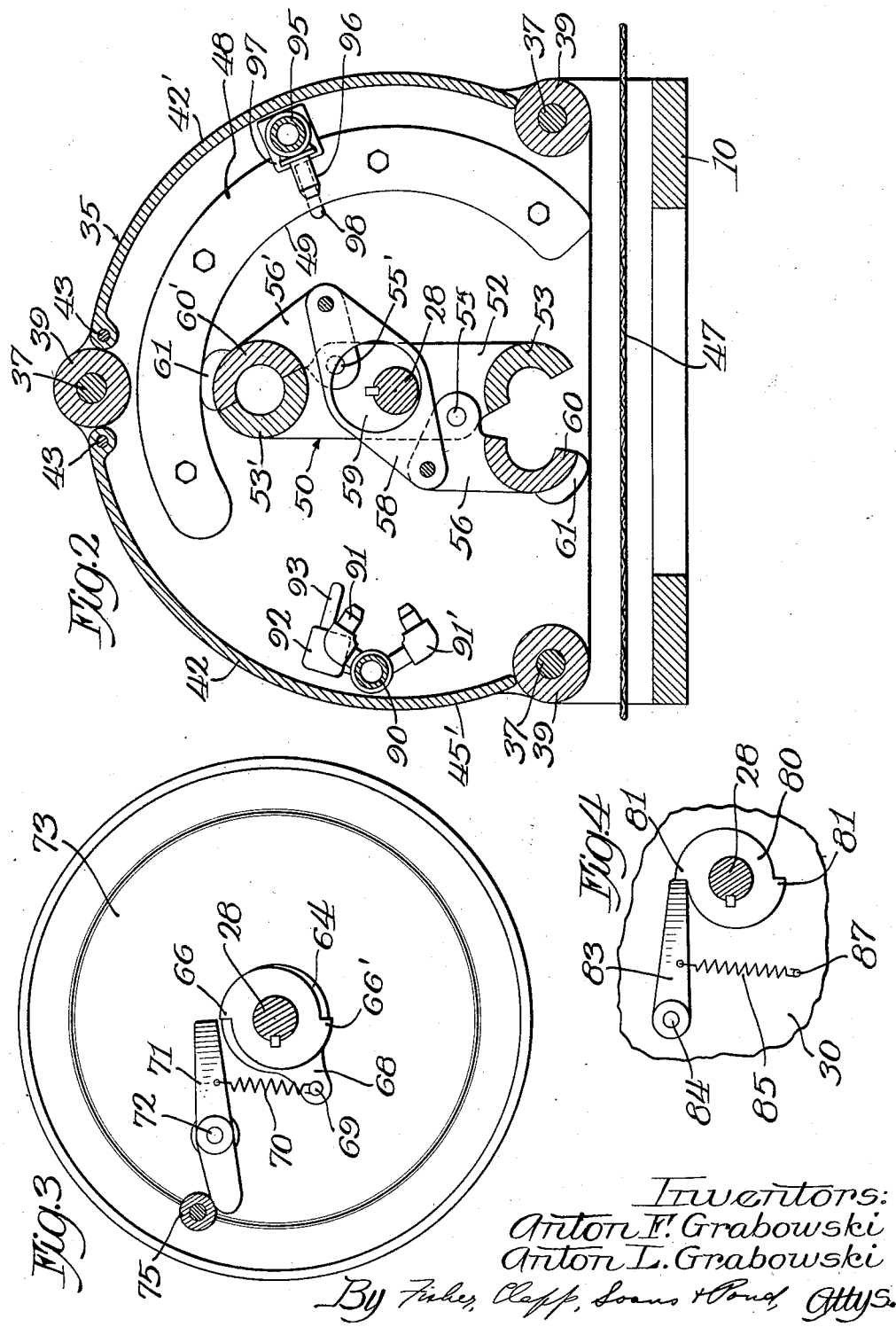

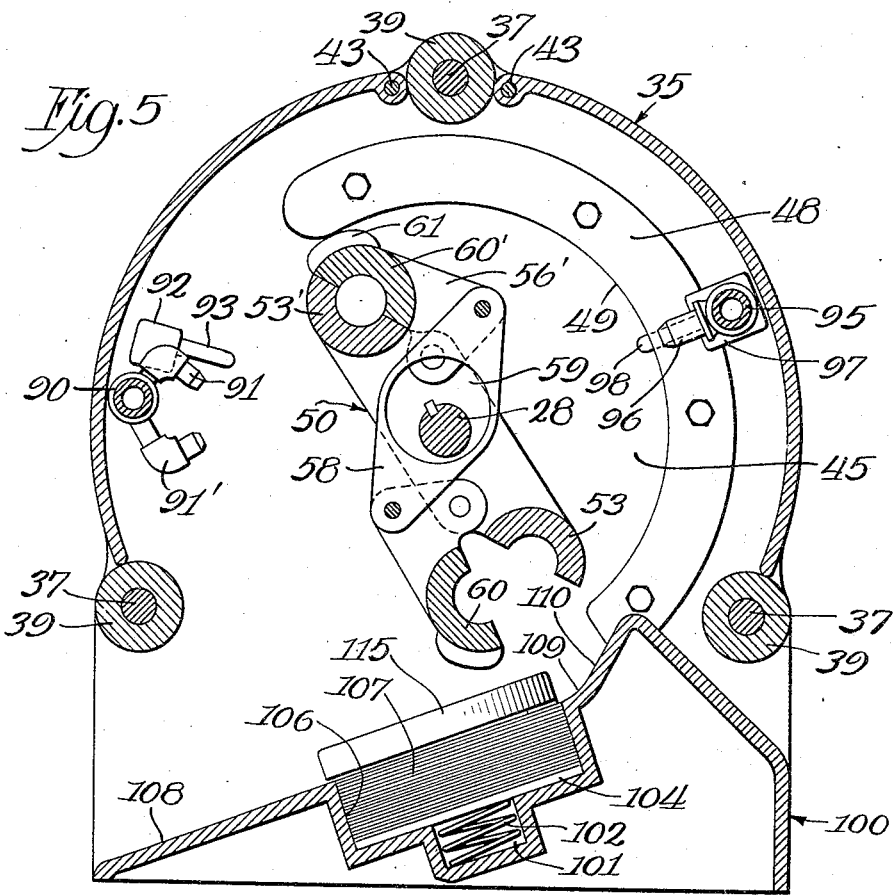
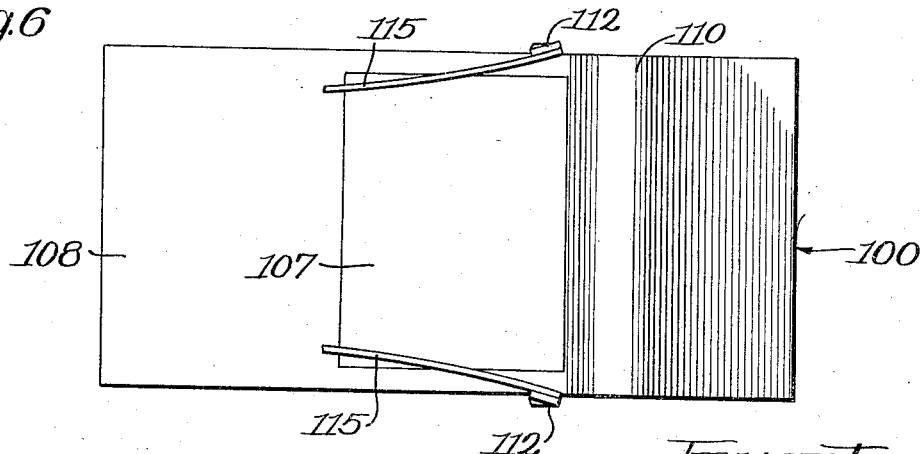

1,871,788

UNITED STATES PATENT OFFICE

ANTON F. GRABOWSKI AND ANTON L. GRABOWSKI, OF CHICAGO, ILLINOIS

APPARATUS AND METHOD FOR MAKING SAUSAGES

Application filed October 24, 1929. Serial No. 402,148.

Our invention has to do with the art of making sausages and the like, and has to do more particularly with apparatus and methods for preparing skinless sausages.

A particular object of our invention is to provide a device capable of producing skinless sausages in large numbers in a rapid, efficient, and sanitary manner.

Another object is to provide a device of the type referred to which will be simple in construction, consisting of a relatively small number of simple parts, inexpensive to construct, certain in operation, and rugged.

Another object is to provide a convenient and efficient method for making skinless sausages.

Still another object is to provide improved means and method for wrapping moist molded articles in a sanitary and efficient manner.

Various other objects and advantages will become obvious to those skilled in the art as the description proceeds.

Referring now to the drawings forming part of this specification and disclosing a preferred embodiment of our invention:

Fig. 1 is a side elevational view of a device embodying our invention.

Fig. 2 is a sectional view taken substantially on the line 2—2 of Figure 1.

Fig. 3 is a sectional view taken substantially on the line 3—3 of Figure 1.

Fig. 4 is a sectional view taken substantially on the line 4—4 of Figure 1.

Fig. 5 is a sectional view similar to that of Figure 2 but showing a modified form of the invention, and Fig. 6 is a top plan view of the improved wrapping means shown in Figure 5.

In the preferred embodiment illustrated, the numeral 10 represents a base plate, on which is mounted a tank or reservoir 12, which is preferably cylindrical and has a piston 13 slidable therein. A conduit 15 leads from any suitable source of fluid for hydraulically actuating the piston 13, and a valve 16 is provided for regulating the flow of fluid to the receptacle 12. This receptacle is preferably provided with a lid 17 and an outlet therefrom is provided, as at 18, for sausage meat or the like. The flow of material out of the receptacle 12 may be regulated by means of a valve 20 which, as shown in Figure 1, may be in the form of a hand-regulated globe type of valve.

The valve 20 communicates through a nipple 21 with a valve 22 which is preferably automatically controlled in a manner to be described. Secured to the stem 23 of the valve 22 is a mitre gear 25 with which meshes a similar gear 26 secured to a shaft 28. The shaft 28 is mounted in suitable bearings provided in walls 30 and 30' of a housing, indicated generally at 35. The walls 30 and 30' are secured by means of tie rods 37 which also extend through an intermediate wall 38 and are provided with sleeves 39. Nuts 40, or the like, are provided at the ends of the tie rods, and front and rear guards 42 and 42', pivoted at their upper ends as at 43, are provided for the housing 35. The wall 30 is provided with an aperture 36 which may be substantially frusto-conical, tapering so as to increase in diameter from the inside to the outside of the wall. Adjacent the outer extremity of the aperture a threaded bushing 37 may be provided for seating a plug or cap (not shown).

Thus, it will be seen that in the particular embodiment shown, the housing 35 provides a pair of chambers 45 and 45'. However, it will be readily understood that any desired number of chambers may be provided.

On the inside of the walls 30 and 30' and on opposite sides of the partition member 38 are provided arcuate cam members 48, which may be secured to the walls by any suitable means, each of the members having a substantially circular cam surface 49. An endless conveyor 47 extends beneath the housing 35.

Keyed to the shaft 28 within each of the chambers 45 and 45' is a sausage molding device indicated generally at 50. Inasmuch as the devices in each chamber are substantially alike, only one of them will be described, with particular reference to Figure 2. Each of the molding devices comprises a pair of arms 52 keyed intermediate of their ends to the shaft 28 and having secured thereto adjacent their ends a pair of substantially semi-cylindrical members 53 and 53'. Pivoted to the arms 52 on each side of the shaft 28, as at 55, is a pair of arms 56 and 56', these arms 56 and 56' being pivoted to a rock shaft 58, having an aperture 59 through which passes the shaft 28. The arms 56 and 56' carry adjacent their free ends substantially semi-cylindrical mold members 60 and 60', which cooperate with the members 53 and 53'. Secured to the mold members 60 and 60' are lugs 61 and 61' which are adapted to cooperate with the cam members 48 in a manner to be presently described.

Keyed to the shaft 28, as best seen in Figure 3, is a bearing 64 having formed thereon a pair of ratchet teeth 66 and 66', and an ear 68 having an eye 69 to which is attached a tension helical spring 70. This spring is secured at its other end to a pawl 71, pivoted in a disc 72 which is arranged to rotate with a pulley 73 on the bearing 64. Secured to the outside of the wall 30 is a stop 75 adapted to co-operate with the pawl 71.

Thus, it will be seen that the shaft 28 is brought into intermittent co-operative relation with the pulley by means of the pawl 71, which is urged towards the ratchet by means of the spring 70, while the lug 75 serves to cam the pawl 71 out of engagement with the ratchet once in every revolution of the pulley so as to disengage the pulley from the shaft.

Keyed to the shaft 28 and to the gear 26 is a ratchet 80 having a pair of teeth 81 and 81' (Figure 4). A pawl 83 pivoted to the outside of the wall 30', as at 84, is resiliently urged into co-operative relation with the ratchet 80 by means of a tension helical spring 85, secured to the wall 30', as at 87.

Mounted within each of the chambers 45 and 45' opposite the cam members 48 is a horizontal conduit 90 provided with upwardly and downwardly dispose nozzles 91 and 91'. These nozzles may be arranged in series along the pipe 90 and the flow of liquid therethrough is controlled by means of a valve 92 actuated by a trigger 93. The horizontal conduit 90 is connected to a source of cold water (not shown).

On the opposite side of each of the chambers 45 and 45'—that is, adjacent the cam members 48—is another conduit 95 arranged in a horizontal plane and having a series of downwardly directed nozzles 96 communicating therewith. The flow of fluid through nozzles 96 is controlled by means of a valve 97 which is actuated by means of a trigger 98. The conduit 95 is connected to a source of steam or hot water. The triggers 93 and 98 are arranged in the path of the lugs 61 and 61', and the valves are of the self-closing type.

The operation of the device is substantially as follows: The portion of the tank 12 above the piston 13 is filled from the top with sausage meat or other desired material, and the lid 17 is then fastened down. Fluid is then admitted through the valve 16 into the chamber of the receptacle 12 below the piston 13 so as to force the piston upwardly and urge the meat out through the valve 20, which is adjusted to permit the desired amount of material to pass. The pulley 73 is connected to any suitable source of power (not shown) by means of belting or the like. However, any suitable driving means may be used.

As the pulley rotates, it intermittently actuates the shaft 28 by means of the pawl 71 and the ratchet teeth 66 and 66' formed on the sleeve 64, so that for every single revolution of the pulley the shaft 28 will make only a half revolution. As the shaft rotates it carries with it the sausage molding devices 50 within the chambers 45 and 45'. These sausage molding devices are so arranged on the shaft as to be stationary momentarily each time that they arrive at a substantially vertical position—that is, at such times as the shaft is disengaged from the pulley (as shown in Figure 2) and shortly before reaching such a position, one of the lugs 61 or 61', as the case might be, comes into contact with the cam surface 49 of the arcuate member 48, thus rocking the arms 56 and 56' and 58 about their pivots in a toggle fashion so as to bring the upper semi-cylindrical member 60 or 60', as the case might be, into co-operative relation with the semi-cylindrical member 53 or 53', so as to form a closed cylindrical chamber, while at the same time rocking the lower semi-cylindrical member 60 or 60' out of engagement with the member 53 or 53'. As the sausage-molding devices 50 are being rotated. the valve 22 is being opened by the gears 25 and 26. Thus, at the moment when the molding mechanism has reached a position as shown in Figure 2, the valve will have been completely opened and the sausage material, urged by the piston 13, will be permitted to flow through the valves 20 and 22 and into the cylindrical molds formed by the co-operating semi-cylindrical members 53' and 60' so as to fill these molds with meat. As the filling material enters the molds, the air is permitted to escape by means of the tapered aperture 36 while any substantial loss of material through this aperture is prevented. In the meanwhile, the pulley 73 will have rotated a half revolution and the pawl 71 will have come into engagement with another one of the ratchet teeth 66 or 66', and the pulley will then be in co-operative relation with the shaft 28. As the pulley continues its rotation, the molding devices 50 will be rotated in a clockwise direction (Figure 2) so that when the cylindrical mold which has just been filled with sausage meat reaches a position in the lower portion of the chamber 45 or 45', the co-operating semi-cylindrical members 53' and 60' will be urged apart by means of the uppermost lug 61 coming into engagement with the cam member 48, and the molded sausages will be permitted to fall out by means of gravity onto the conveyor 47 to be discharged by the device into suitable packages or smoking apparatus.

As either of the lugs 61 or 61' contacts with the trigger 93, the latter will be rotated and the valve 92 opened, thus permitting a spray of cold water to be directed into the mold members by the nozzles 91 and 91'. The result of this operation is to provide a film of water on the inside of the mold members so as to prevent the sausage meat from sticking thereto. After one of the molds has been filled with meat and the rotation is resumed, the engagement of one of the lugs 61 or 61' with the trigger 98 will result in opening the valve 97 and will cause a spray of steam or hot water from the nozzles 96 to impinge upon the outer surfaces of the molds, thus causing a film of albumin to coagulate on the outside of the meat within the mold. After the molds have been opened in the manner described above, the molded sausages will readily drop therefrom because of the film of water within the mold members, but the film of coagulated albumin will enable each sausage to retain its shape.

The pawl 83 co-operates with the ratchet 80 so as to retain the shaft 28 from rotation backward or in a counter clockwise direction (Figure 2), while the shaft is disengaged from the pulley.

It will be seen that, in the operation of the device above described, the entire process of molding sausages is automatic, the meat being placed in the container 12 and the finished sausages being fed out of the device. The machine is substantially fool-proof and requires practically no attention.

Figures 5 and 6 show a form of the invention which is substantially similar to that described above except that a novel arrangement is provided for wrapping the sausages as they are discharged from the mold members. Arranged in the lower portion of each of the chambers 45 and 45' is a support 100 having a cylindrical cavity 101 adapted to house a helical compression spring 102 which abuts against a follower 104 disposed in a cavity 106 communicating with and larger than the cavity 101. This cavity 106 is adapted to seat a stack of sheets 107 of paper or other wrapping material. As shown best in Figure 5, the cavity 106 is arranged so as to have one of its axes inclined to the horizontal and parallel to an inclined upper surface 108 of the member 100. On the opposite side of the cavity 106 from the surface 108 is a surface 110 which is preferably inclined at a greater angle than that of the surface 108, and may have an arcuate portion 109. Secured to the top of the member 100 adjacent the cavity 106, as at 112, is a pair of spring fingers 115.

In the operation of the form shown in Figures 5 and 6, when a molded sausage drops from the mold members 60 and 53, it falls upon the curved surface 109 and immediately starts rolling at considerable speed down the inclined surface of the uppermost sheet 107. Because of its moist surface, the sausage picks up the sheet of wrapping material as it passes over the edge thereof and wraps itself in the sheet as it continues its downward rolling movement. The sheets are purposely made somewhat wider than the length of the sausage so that a short margin of wrapping material is provided at each end of the sausage. This excess of the sheet will form a cylindrical section at each end of the sausage which will contact with the spring fingers 115 as the sausage moves down the inclined surface, and these fingers, pressing against the excess material, will tend to fold it inwardly toward the sausage so as to close the ends of the package and produce a neatly wrapped article.

It is obvious that many modifications may be made in the above described device without departing from the spirit of our invention. It will be readily apparent, for example, that methods and apparatus embodying our invention may be employed for molding and for wrapping various other types of articles besides sausages. Hence, we do not wish to be limited to the particular form shown or uses mentioned, but we wish our invention to be limited solely by the scope of the appended claims, which are to be interpreted as broadly as is consistent with the state of the art.

We claim as our invention:

1. In a device of the class described and in combination, a rotatable shaft, a pair of mold members arranged as a unit on opposite sides of said shaft, each of said mold members comprising a part fixed to said shaft and a co-operating part movable relative to said shaft, and means for bringing one of said movable parts into engagement with its co-operating part while bringing the other of said movable parts out of engagement with its co-operating part.

2. In a device of the class described and in combination, a rotatable shaft, a pair of mold members arranged as a unit on opposite sides of said shaft, each of said mold members comprising a part fixed to said shaft and a co-operating part movable relative to said shaft, means for bringing one of said movable parts into engagement with its co-operating part while bringing the other of said movable parts out of engagement with its co-operating part, means for intermittently rotating said shaft, and means operating intermittently for filling the mold member whose parts are in co-operative relation.

3. In a device of the class described and in combination, a rotatable shaft, a pair of mold members arranged as a unit on opposite sides of said shaft, each of said mold members comprising a part fixed to said shaft and a co-operating part movable relative to said shaft, and cam means for bringing one of said movable parts into engagement with its co-operating part while bringing the other of said movable parts out of engagement with its co-operating part.

4. In a device of the class described and in combination, a rotatable shaft, a pair of mold members arranged as a unit on opposite sides of said shaft, each of said mold members comprising a part fixed to said shaft and a co-operating part movable relative to said shaft, cam means for bringing one of said movable parts into engagement with its co-operating part while bringing the other of said movable parts out of engagement with its co-operating part, means for intermittently rotating said shaft, and means operating intermittently for filling the mold member whose parts are in co-operative relation.

5. In a machine for making skinless sausage, the combination of a sausage forming mold comprising a plurality of cooperating parts forming the mold cavity, said parts being relatively adjustable from closed, sausage forming position, to open, sausage discharging position, means for mounting said mold for movement along a predetermined path of travel, means for moistening the inside of the mold, means for injecting sausage meat into the moistened mold when the latter is in closed position, means for applying heat to the mold to form a surface jacket around the meat contained in the mold, and means for opening the mold subsequent to said heating for discharging the sausage formed therein.

6. In a machine for making skinless sausage, the combination of a sausage forming mold comprising a plurality of cooperating parts forming the mold cavity, said parts being relatively adjustable from closed, sausage forming position, to open, sausage discharging position, means for mounting said mold for movement along a predetermined path of travel, means for moistening the inside of the mold, means for injecting sausage meat into the moistened mold when the latter is in closed position, means for applying heat to the mold to form a surface jacket on the meat contained in the mold, and means operative as an incident to the travel of the mold for opening the same to discharge the sausage formed therein.

7. In a machine for making skinless sausage, the combination of a sausage forming mold comprising a plurality of cooperating parts forming the mold cavity, said parts being relatively adjustable from closed, sausage forming position, to open, sausage discharging position, means for mounting said mold for movement along a predetermined path of travel, means for moistening the inside of said mold when empty, means for injecting sausage meat into the moistened mold when in closed position, means for spraying said mold with steam to heat the same, thereby to form a jacket on the meat contained in the mold, and means for opening said mold to discharge the sausage formed therein.

8. In a machine for making skinless sausage, the combination of a sausage forming mold comprising a plurality of cooperating parts forming the mold cavity, said parts being relatively adjustable from closed, sausage forming position, to open, sausage discharging position, means for mounting said mold for movement along a predetermined path of travel, means for spraying the inside of said mold with water, means for injecting sausage meat into the moistened mold when in closed position, means for spraying said mold with steam to heat the same, thereby to form a jacket on the meat contained in the mold, and means for opening said mold to discharge the sausage formed therein.

9. In a device of the class described, the combination of a plurality of molds mounted for unitary movement through a predetermined path of travel, said molds respectively comprising a pair of elongated, substantially semi-cylindrical cooperating parts, one of the parts of each of said pairs being adjustable to open and closed positions relative to the other, means connecting the adjustable parts of two such pairs for simultaneous adjustment of the respective parts in opposite directions, and means operative as an incident to the travel of said molds to effect said adjustment of said mold parts.

10. In a machine for making skinless sausage, the combination of a plurality of molds respectively comprising a pair of relatively adjustable cooperating parts, means for adjusting the parts of certain of said molds into closed, sausage forming relation and for adjusting the parts of another of said molds to open, sausage discharging relation, and means for injecting sausage meat under pressure into the closed molds.

11. In a device of the class described, the combination of a plurality of molds, each comprising a pair of relatively adjustable cooperating parts, means connecting adjustable parts of a pair of said molds for simultaneous adjustment in opposite directions relative to their respective complementary parts, and means acting on one of said adjustable mold parts and operative through said connecting means to effect such simultaneous adjustment of said adjustable parts.

12. In a sausage-making machine, the combination of a supporting frame, a shaft rotatably mounted in said frame, a sausage-forming mold carried by said shaft, means for intermittently rotating said shaft and the mold carried thereby, a conduit for supplying sausage meat to said mold, a valve for regulating the flow of the meat through said conduit, and a connection between said shaft and said valve for alternately opening and closing said valve in timed relation with the intermittent rotation of the shaft and mold.

13. In a machine for making sausage, the combination of a sausage-forming mold comprising a plurality of co-operating parts forming the mold cavity, said parts being relatively adjustable from closed, sausage-forming position to open, sausage-discharging position, means for moving said mold along a predetermined path of travel, means for automatically and alternately opening and closing said mold, means for injecting sausage meat into the mold when the latter is closed, means for applying heat to said mold after the same is filled to thereby form a jacket around the contents of the mold, and means for automatically moistening the inside of the mold prior to the injection of said sausage meat thereinto.

14. In a machine for making skinless sausage, the combination of a mold comprising a plurality of cooperating parts forming the mold cavity, said parts being relatively adjustable from closed, sausage forming position to open, sausage discharging position, means for moving said mold along a predetermined path of travel, means for automatically and alternately opening and closing said mold, means for injecting sausage materal into the mold when the latter is closed, and means for applying heat to said mold as the same is filled to thereby form a jacket around the contents of the mold.

ANTON F. GRABOWSKI.
ANTON L. GRABOWSKI.